United States Patent [19]
Hanlon et al.

[11] Patent Number: 4,767,550
[45] Date of Patent: Aug. 30, 1988

[54] VICINAL DIOL CONTAINING MONOMERS AND POLYMERS AND METHODS OF TREATING A SUBTERRANEAN FORMATION

[75] Inventors: David Hanlon; Marlin Holtmyer; Mike Conway; Charles Hunt, all of Duncan, Okla.

[73] Assignee: Halliburton Company, Duncan, Okla.

[21] Appl. No.: 32,917

[22] Filed: Mar. 31, 1987

Related U.S. Application Data

[63] Continuation of Ser. No. 818,834, Jan. 14, 1986, abandoned.

[51] Int. Cl.$^4$ ................................................ C09K 7/02
[52] U.S. Cl. ............................ 252/8.551; 166/305.1; 526/287; 526/292.2; 526/292.3; 526/304; 526/320

[58] Field of Search ................. 526/287, 292.2, 292.3, 526/304, 320; 175/65, 72; 252/8.514, 8.51, 8.551

[56] References Cited

U.S. PATENT DOCUMENTS

| | | | |
|---|---|---|---|
| 4,056,496 | 11/1977 | Mancini | 526/320 |
| 4,147,681 | 4/1979 | Lim | 526/207 |
| 4,224,150 | 9/1980 | Buriks | 526/207 |
| 4,319,013 | 3/1982 | Cabestany | 526/287 |
| 4,605,718 | 8/1986 | Jansma | 526/240 |
| 4,610,305 | 9/1986 | Martin | 526/304 |

Primary Examiner—Christopher Henderson
Attorney, Agent, or Firm—Robert A. Kent

[57] ABSTRACT

The present invention provides vicinal diol containing monomers and polymers and methods of preparing and using such monomers and polymers. When crosslinked in aqueous fluids, the polymers form high viscosity gels which are stable at high temperatures.

6 Claims, No Drawings

VICINAL DIOL CONTAINING MONOMERS AND POLYMERS AND METHODS OF TREATING A SUBTERRANEAN FORMATION

This is a continuation of application Ser. No. 818,834 filed Jan. 14, 1986 now abandoned.

BACKGROUND OF THE INVENTION

1. FIELD OF THE INVENTION

The present invention relates generally to vicinal diol containing monomers and polymers. More specifically, this invention provides monomers and polymers containing vicinal diol groups, methods of preparing such monomers and polymers and high viscosity, high temperature stable aqueous gels formed with the polymers which are particularly useful in treating subterranean formations.

2. DESCRIPTION OF THE PRIOR ART

Gelled aqueous fluids are used in a variety of industrial applications to bring about desired results. For example, in the oil industry, gelled aqueous fluids are commonly utilized in carrying out completion, various production stimulation, enhanced production, conformance control and other treatments in subterranean formations containing hydrocarbons. Such gelled aqueous fluids have included both naturally occurring and synthetic water soluble polymer gelling agents as well as agents which cause the polymers to cross-link. The term "aqueous fluid" is used herein to mean any fluid containing some water. The fluid can also contain other components such as alcohols, acids, salts and other miscible or partially miscible substances, gasifiable components such as $CO_2$ and $N_2$, and solids.

The naturally occurring polymer gelling agents utilized heretofore include solvatable polysaccharides such as galactomannan gums, glucomannan gums and cellulose derivatives. The synthetic polymer gelling agents include polyacrylate, polymethacrylate, acrylamide-acrylate copolymers, and others. The crosslinking agents utilized include compounds containing multivalent metals which are capable of releasing metal ions in an aqueous fluid such as multivalent metal salts. Examples of the multivalent metal ions are chromium, zirconium, antimony, titanium, iron, tin, zinc and aluminum.

While the heretofore utilized gelled aqueous fluids have been effective at temperatures below about 180° F., at temperatures above about 200° F., and particularly where the aqueous fluids are brines or otherwise contain calcium ions, such gelled aqueous fluids are unstable in that they precipitate or rapidly degrade and revert to thin fluids. Since many subterranean formations requiring procedures or treatments utilizing gelled aqueous fluids exist at temperatures above about 200° F., there is a need for gelled aqueous fluids which are stable at such high temperatures. The terms "stable at high temperatures" and "high temperature stability" are used herein with respect to gelled aqueous fluids to mean that the gelled aqueous fluids retain substantial viscosity for times greater than about 6 to 8 hours at temperatures in the range of from about 180° F. to in excess of 300° F.

By the present invention, monomers containing vicinal diol groups, polymers formed therefrom and high viscosity gelled aqueous fluids formed with such polymers which are stable at high temperatures are provided.

SUMMARY OF THE INVENTION

The present invention provides monomers containing vicinal diol groups having the following structural formula:

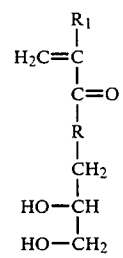

wherein:
R is oxygen or

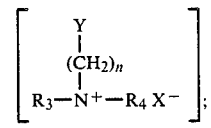

$R_1$ is hydrogen or methyl;
$R_3$ and $R_4$ are independently methyl or ethyl;
Y is oxygen or NH;
$X^-$ is a halogen, $\frac{1}{2}(SO_4)^-$, $CH_3SO_4^-$, $C_2H_3SO_4^-$ or $CH_3COO^-$; and
n is 2 or 3.

Methods of preparing such monomers, polymers containing crosslinkable vicinal diol groups, methods of preparing the polymers and methods of forming and using high viscosity gelled aqueous fluids with the polymers are also provided.

DESCRIPTION OF PREFERRED EMBODIMENTS

In accordance with the present invention, water soluble vinyl monomers containing vicinal diol groups are provided having the structural formula:

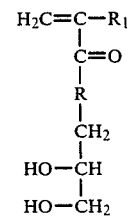

wherein:
R is oxygen or

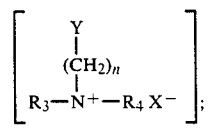

$R_1$ is hydrogen or methyl;
$R_3$ and $R_4$ are independently methyl or ethyl;
Y is oxygen or NH;

$X^-$ is a halogen, $\frac{1}{2}(SO_4)^-$, $CH_3SO_4^-$, $CH_2H_3SO_4^-$ or $CH_3COO^-$; and n is 2 or 3.

Vicinal diol containing monomers represented by the above structural formula where R is

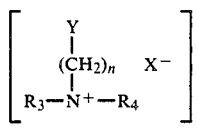

can be prepared by reacting a water soluble vinyl monomer containing a tertiary amine group with a reactive vicinal diol forming or containing compound. Particularly suitable starting water soluble vinyl monomers containing tertiary amine groups are those having the structural formula:

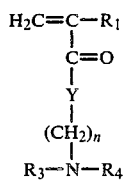

wherein $R_1$ is hydrogen or methyl, Y is oxygen or NH, $R_3$ and $R_4$ are independently methyl or ethyl, and n is 2 or 3. Examples of such monomers are dimethylaminopropylmethacrylamide (hereinafter referred to as DMAPMA), dimethylaminoethylmethacrylamide (hereinafter referred to as DMAEMA), dimethylaminopropylacrylate (hereinafter referred to as DMAPA), dimethylaminoethylmethacrylate (hereinafter referred to as DMAEM), diethylaminoethylmethacrylate (hereinafter referred to as DEAEM) and diethylaminoethylacrylate (hereinafter referred to as DEAEA). Of these, DMAPMA is the most preferred.

Examples of reactive vicinal diol forming or containing compounds which can be utilized are glycidol and 3-halo-1, 2-propanediol compounds such as 3-chloro-1,2-propanediol (α-chlorohydrin) and 3-bromo-1,2-propanediol.

In one technique glycidol, an epoxide, is reacted with the starting vinyl monomer. The nucleophilic amine cleaves the epoxide ring and a proton is consumed in the reaction. Therefore, the addition of a neutralizing acid or other proton source is required as the reaction proceeds. More specifically, the starting vinyl monomer and glycidol reactants are diluted with equal parts of water to make 50% active solutions. The glycidol solution and starting vinyl monomer solution are slowly combined in equal molar amounts while enough of the proton source used, e.g., a 50% by weight acid solution to maintain the pH of the reaction mixture in the range of from about 7.5 to about 12 is simultaneously added. The temperature of the reaction mixture is preferably controlled in the range of from about 10° to 20° C. while the glycidol and proton source are added to the vinyl monomer solution and then raised to about 40° C.

When the starting vinyl monomer is DMAPMA and the proton source is sulfuric acid, the vicinal diol containing monomer formed by the procedure described above is methacrylamidopropyldimethyl-2, 3-dihydroxypropylammonium sulfate (hereinafter referred to as MAPDMDHPAS). The procedure and reaction are represented schematically as follows:

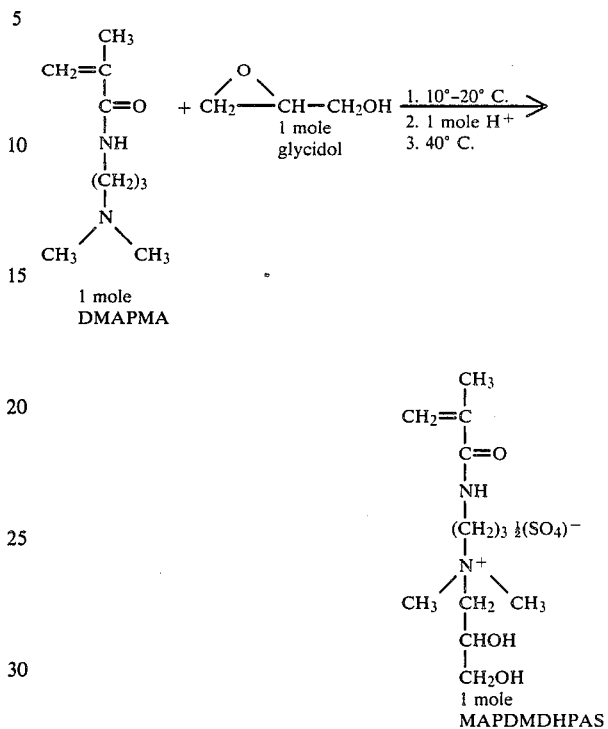

A similar synthesis procedure is to convert the starting amine group containing monomer to the amine salt before reacting it with glycidol. For example, one mole of the starting monomer in a 50% aqueous solution can be combined with one mole of proton source prior to combining glycidol therewith. Glycidol is then combined with the salt formed at a temperature of about 10° to 20° C. followed by raising the temperature to about 40° C. while the reaction goes to completion. When the starting monomer is DMAPMA and the proton source is sulfuric acid, MAPDMDHPAS is formed.

Another synthesis procedure which can be utilized to form the quaternary ammonium type of vicinal diol containing monomer is to react the starting vinyl monomer with 3-halo-1,2-propanediol. For example, a 50% aqueous solution of the starting monomer can be combined with an equal molar quantity of 3-halo-1,2-propanediol at a temperature of about 40° C. to form the vicinal diol containing monomer.

When the starting monomer is DMAPMA and the vicinal diol containing compound is 3-chloro-1,2-propanediol (chlorohydrin), the vicinal diol containing monomer formed is methacrylamidopropyldimethyl-2,3-dihydroxypropylammonium chloride (hereinafter referred to as MAPDMDHPAC). This procedure and reaction are represented schematically as follows:

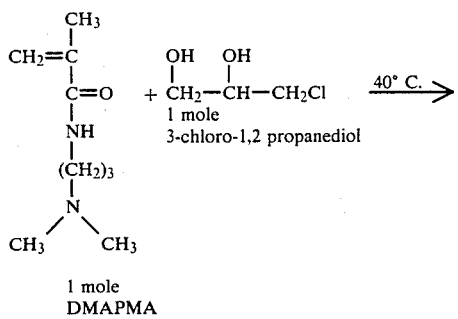

1 mole
DMAPMA

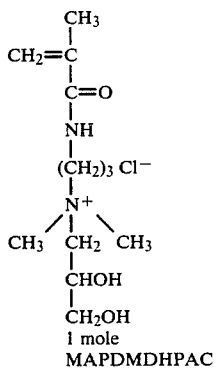

1 mole
MAPDMDHPAC

Vicinal diol containing monomers represented by the above structural formula wherein R is oxygen can be prepared by reacting glycidyl methacrylate (hereinafter referred to as GMA) with a proton source and a hydroxyl group to form 2-3 dihydroxylpropyl methacrylate (hereinafter referred to as DHPMA). The reaction can be carried out in the presence of an acid as a proton source and water as a hydroxyl source.

This procedure and reaction are represented schematically as follows:

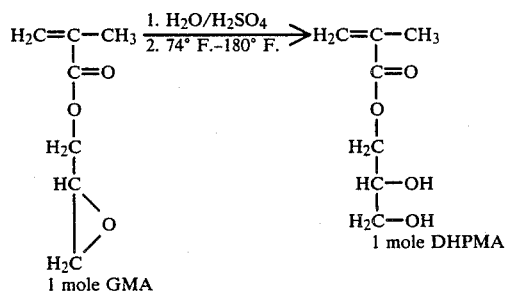

In an alternate procedure for forming vicinal diol containing monomers wherein R is oxygen, methacrylic acid (hereinafter referred to as MAA) is reacted with glycidol in the presence of triethylamine (hereinafter referred to as ET₃N) to form DHPMA. This procedure and reaction are represented schematically as follows:

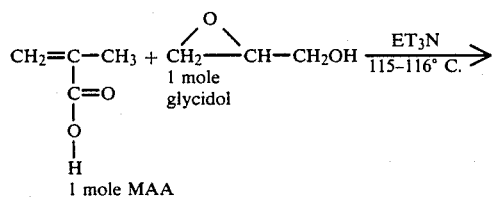

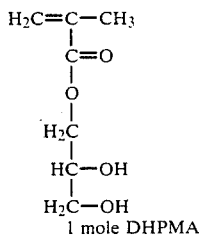

1 mole DHPMA

In another aspect of the present invention, water soluble polymers containing crosslinkable vicinal diol groups are provided. Such polymers can be formed from the vicinal diol containing monomers of this invention described above. That is, a vicinal diol containing vinyl monomer is polymerized with one or more other monomers to form a high molecular weight (above about 100,000) polymer containing crosslinkable vicinal diol groups. The polymerization reaction can be carried out utilizing known water-in-oil emulsion techniques or aqueous solution techniques.

Examples of monomers which can be utilized with the vicinal diol containing monomers in the polymerization reaction to form copolymers or terpolymers are DMAPMA, methacrylamidopropyltrimethylammonium chloride (hereinafter referred to as MAPTAC), N,N-dimethylacrylamide (hereinafter referred to as NNDMA), acrylamide, methacrylamide, 2-acrylamido-2-methylpropanesulfonic acid (hereinafter referred to as AMPS), sodium styrene sulfonate, N-vinyl-2-pyrrolidone and acrylic acid. Preferably, the vicinal diol containing vinyl monomer MAPDMDHPAS is polymerized with NNDMA to form a copolymer with a mole ratio of 9 moles of NNDMA to 1 mole of MAPDMDHPAS. However, other copolymers and terpolymers of other mole ratios using a variety of other monomers can be formed and utilized in accordance with this invention as illustrated in the examples which follow.

In an alternate procedure for forming the vicinal diol containing polymers of this invention, a polymer starting material can be reacted with glycidol to add the vicinal diol group to the polymer. For example, a copolymer of DMAEM and acrylamide can be reacted with glycidol at a pH of about 10 to form a vicinal diol containing polymer equivalent to a polymer containing equivalent mole amounts of acrylamide, DMAEM and the quaternization product of DMAEM and glycidol formed from monomer starting materials.

As mentioned above, the polymers of this invention containing vicinal diol groups are water soluble and hydrate in aqueous fluids. Upon being crosslinked by way of the diol groups, a high viscosity, high temperature stable, crosslinked aqueous fluid results.

In forming a high viscosity gelled aqueous fluid of this invention which is stable at high temperatures, a polymer containing crosslinkable vicinal diol groups is dissolved in an aqueous fluid. Generally, the polymer is dissolved in the aqueous fluid in an amount in the range of from about 0.004 to about 0.8 pounds of active polymer per gallon of solution, preferably in the range of from about 0.02 to about 0.08 pounds per gallon of solution. A crosslinking agent is combined with the aqueous fluid-polymer solution to thereby crosslink the vicinal diol groups of the polymer whereby a high viscosity, high temperature stable, gelled aqueous fluid is formed. The crosslinking agent is combined with the aqueous fluid-polymer solution in an amount in the range of from about 0.001 pounds/gallon of solution to about 0.2 pounds/gallon of solution.

The crosslinking agents that can be utilized in the present invention can generally be described as water soluble salts and complexes of multivalent cations which are capable of forming a crosslinked gel with vicinal diol groups of the polymer. Examples of the multivalent metal cations are zirconium, antimony, titanium, iron, tin, chromium and aluminum. In addition to the metal cations, boron can be utilized as a crosslinking agent. Particularly preferred such crosslinking agents are zirconium salts, such as zirconium lactate, zirconium acetate, and zirconium oxychloride, chrome citrate, and titanium triethanolamine, the most preferred being a zirconium lactate crosslinking composition.

A particularly suitable zirconium lactate crosslinking composition can be prepared by adding about 2 moles of lactic acid to a quantity of water sufficient to allow mixing of ingredients and adjusting the pH of the resulting acid solution to about 7 with ammonium hydroxide. About one mole of zirconium metal ion having a valence of +4, preferably as zirconium oxychloride, is then added to the solution to form the crosslinking composition.

Another similar suitable zirconium lactate crosslinking composition includes 2 moles of triethanolamine in addition to the lactic acid and zirconium oxychloride added at a pH of about 7.

The high viscosity, high temperature stable, gelled aqueous fluids formed in accordance with the present invention utilizing polymers containing vicinal diol groups are particularly suitable for carrying out completion, stimulation, enhanced production and other treatments in high temperature subterranean formations, e.g., formations existing at temperatures above about 180° F. Examples of such treatments where high viscosity gelled aqueous fluids are utilized are treatments for consolidating loose sands in formations, acidizing formations, fracturing formations, and enhancing production from formations. In accordance with the present invention, such treatments and others are carried out in high temperature subterrenean formations by contacting the formations with highly viscous aqueous gels comprised of aqueous fluids, water soluble polymers containing vicinal diol groups of the present invention and crosslinking agents.

To further illustrate the present invention and facilitate a clear understanding thereof, the following examples are given.

EXAMPLE 1

A water soluble vicinal diol containing vinyl monomer (MAPDMDHPAS) is prepared from DMAPMA and glycidol starting materials as follows.

170.26 g (1 mole) of dimethylaminopropylmethacrylamide (DMAPMA) are placed in a glass vessel containing a magnetic stirrer and mixed with 294.91 g of deionized water. Two addition funnels are suspended above the vessel; one containing 75.6 g of glycidol and the other containing 49.05 g of concentrated H$_2$SO$_4$. The pH and temperature of the reaction mixture are monitored continuously while the H$_2$SO$_4$ is added dropwise over a period of about 30 minutes. Prior to the H$_2$SO$_4$ addition, the solution is cooled to 19° C. and the solution has a pH of 11.3. After the H$_2$SO$_4$ addition, the solution is cooled to 15° C. and has a pH of 7.5. The glycidol is next added dropwise and the vessel is warmed to about 21° C. using a hotplate. The glycidol addition time is 1 hour and 35 minutes and the final pH is 7.41. The reaction mixture is heated to and maintained at 40° C. for 40 hours. The final pH is 9.5. Analysis of the reaction indicates a trace of DMAPMA along with MAPDMDHPAS monomer.

The structure of the synthesized MAPDMDHPAS monomer is indicated to be as follows:

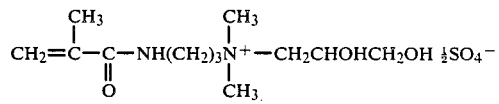

EXAMPLE 2

DHPMA is prepared by placing 10 g of concentrated sulfuric acid in 80 g of deionized water. 90 g of GMA are slowly added to the acid solutions while being stirred. The reaction mixture gradually increases in temperature to 180° F. The solution is then placed in an ice bath to maintain the reaction temperature between 74° and 180° F. This procedure is continued until all GMA is added. The resulting DHPMA monomer is then ready for use.

EXAMPLE 3

DHPMA is prepared by placing the following materials in a 100 ml round bottom flask with side arm, condensor, and addition funnel:

10.5 g methacrylic acid
0.03 g hydroquinone
0.41 ml ET$_3$N (triethylamine with micropipette).

The flask and contents are heated in an oil bath to 118° C. and then cooled to 114.5° C. 7.43 g glycidol are next added to the flask. The glycidol is added at a one-drop per 4–5 second rate over the next 10-minute period while keeping the temperature at 115°–116° C. The reaction product in the flask changes from clear to slight yellow in color during addition and is slowly cooled to 89° C. during the next 15 minutes. Vacuum is applied until boiling commences at 83° C. After the boiling stops the temperature is raised to 95°–100° C. and boiling and vacuum are again continued for one hour to remove excess acid. An NMR analysis of the final reaction mixture reveals that 2,3-dihydroxypropylmethacrylate is the major component.

EXAMPLE 4

Homopolymers, copolymers and terpolymers are prepared using the vicinal diol containing monomer (MAPDMDHPAS) prepared as described in Example 1 and other monomers. A water-in-oil emulsion technique is used which is illustrated by the following procedure wherein a copolymer of acrylamide (90 mole %) and MAPDMDHPAS (10 mole %) is prepared.

The following ingredients are mixed with stirring until homogeneous to form an aqueous phase:

| | |
|---|---|
| 50% aqueous MAPDMDHPAS | 58.67 g |
| 46% aqueous acrylamide | 139.23 g |
| deionized water | 20.0 g |
| ethylenediamine tetracetic acid, disodium salt, dihydrate (Na$_2$ EDTA) | .05 g |
| sodium chloride | 6.0 g |

The pH of the aqueous phase is adjusted to 7.42 with 0.15 ml 50% NaOH.

The following ingredients are mixed to form an oil phase.

| | |
|---|---|
| a mixture of isoparaffinic hydrocarbons (ISOPAR M) | 81 g |
| sorbitan monooleate | 6 g |

The oil phase is added to a 500 ml Waring blendor jar fitted with a lid containing two openings for an $N_2$ inlet tube and an addition funnel. The oil phase and waring blendor jar are sparged with $N_2$ gas. The aqueous phase is introduced into the oil phase over a 1½ minute period while stirring at about 4000 rpm. The resulting emulsion is stirred for an additional 5 minutes at the same rate.

The emulsion is added to a presparged one-liter glass kettle fitted with a stirrer, a $N_2$ inlet tube, a $N_2$ exit tube, and a thermocouple probe with a digital readout. The water-in-oil comonomer emulsion is stirred at an rpm of from about 500 to about 1500 and sparged with $N_2$ gas while heating to 40° C. in about 30 minutes, followed by the addition of 0.2 g sodium bisulfite. Stirring and sparging are continued while maintaining the temperature at about 40° C. for 15 minutes, followed by the addition of 0.1 g 2,2'-azobis(2,4dimethylvaleronitrile) initiator. After about 45 minutes, a mild exotherm starts which continues for about 3 hours. The temperature is maintained for one additional hour and an additional 0.1 g of 2,2-azobis(2,4dimethylvaleronitrile) is added. The temperature is increased to about 60° C. and held for about one hour after which the emulsion is cooled to room temperature. This emulsion is homogeneous and stable.

The inversion of the emulsion is caused by adding 3.33 g of the emulsion to a Waring blendor containing 100 g of API brine and 0.3 ml of a 50% solution of dimethylbenzyltallow ammonium chloride "API brine" is a laboratory brine formulation comprised of 1350 g NaCl and 150 g $CaCl_2$ dissolved in 13500 g of deionized water and filtered through E-D grade 617 filter paper or equivalent. Inversion of the polymer into the brine occurs in seconds as evidenced by a large increase in viscosity.

A number of polymers are prepared utilizing the general procedure described above. The identification of the polymers and synthesis reaction conditions involved are set forth in Tables I and II below.

The polymers are identified using a code that gives the mole % of the various monomers used in their preparation. That is, three numbers are used (0.0.0) representing, in order, mole % acrylamide, mole % NNDMA, and mole % of a termonomer. These are followed by a letter which represents the termonomer or a monomer substituted for the NNDMA, where A is dimethylaminopropylmethacrylamide (DMAPMA), DS is methacrylamidopropyldimethyl-2, 3-dihydroxypropylammonium sulfate (MAPDMDHPAS), DC is methacrylamidopropyldimethyl-2,3-dihydroxypropyl ammonium chloride (MAPDMDHPAC), Q is methacrylamidopropyltrimethyl ammonium chloride (MAPTAC) and M is methacrylamide. Sometimes a fourth number is used which represents the particular polymer synthesis. The presence of a P indicates that it is an emulsion polymer. The presence of a K or the absence of P indicates a solution polymer. The number of the polymer sometimes follows the P in the polymer identification code.

TABLE I

| | | Polymer Synthesis Mole % of Monomer Feed | | | | | | |
|---|---|---|---|---|---|---|---|---|
| Polymer No. | Polymer Identification | Monomer 1 | Mole % | Monomer 2 | Mole % | Monomer 3 | Mole % | Polymer Activity % |
| 1-5 | 90.0.10Q.P1-5 | AcAm | 90 | MAPTAC | 10 | — | — | 30.6 |
| 6 | 90.0.10DC.P6 | AcAm | 90 | MAPDMDHPAC | 10 | — | — | 30.6 |
| 7 | 90.0.100A.P7 | AcAm | 90 | DMAPMA | 10 | — | — | 29.9 |
| 8 | 90.0.10A.P8 | AcAm | 90 | DMAPMA.½H$_2$SO$_4$ | 10 | — | — | 30.6 |
| 9 | 90.0.10DS.P9 | AcAm | 90 | MAPDMDHPAS | 10 | — | — | 31.0 |
| 10 | 90.3.0.9.7DS.P10 | AcAm | 90.3 | MAPDMDHPAS | 9.7 | — | — | 31.5 |
| 11 | 100.0.0.P11 | AcAm | 100 | — | — | — | — | 30.7 |
| 12 | 0.0.100DS.P12 | — | — | MAPDMDHPAS | 100 | — | — | 30.6 |
| 13 | 50.0.50DS.P13 | AcAm | 50 | MAPDMDHPAS | 50 | — | — | 32.8 |
| 14 | 90.0.10DS.P14 | AcAm | 90 | MAPDMDHPAS | 10 | — | — | 25.0 |
| 15 | 80.0.20DS.P15 | AcAm | 80 | MAPDMDHPAS | 20 | — | — | 30.0 |
| 16 | 80.0.20DS.P16 | AcAm | 80 | MAPDMDHPAS | 20 | — | — | 30.8 |
| 17 | 90.0.10DS.P17 | AcAm | 90 | MAPDMDHPAS | 10 | — | — | 30.0 |
| 18 | 50.40M.10DS.P18 | AcAm | 50 | MAPDMDHPAS | 10 | MAA | 40 | 30.0 |
| 19 | 90.0.10Q.P19 | AcAm | 90 | MAPTAC | 10 | — | — | 30.0 |
| 20 | 90.0.10DS.P20 | AcAm | 90 | MAPDMDHPAS | 10 | — | — | 30.0 |
| 21 | 80.10Q.10DS.P21 | AcAm | 80 | MAPDMDHPAS | 10 | MAPTAC | 10 | 30.0 |

AcAm—Acrylamide
MAPTAC—Methacrylamidopropyltrimethylammonium chloride
MAPDMDHPAC—Methacrylamidopropyldimethyldihydroxypropylammonium chloride
DMAPMA—Dimethylaminopropylmethacrylamide
MAPDMDHPAS—Methacrylamidopropyldimethyldihydroxypropylammonium sulfate
MAA—Methacrylamide

TABLE II

| | Polymer Synthesis Reaction Conditions | | | | | | | | | | |
|---|---|---|---|---|---|---|---|---|---|---|---|
| Polymer No. | Monomers (g) | H$_2$O (g) | NaCl (g) | Na$_2$, EDTA (g) | pH | NaHSO$_3$ (g) | Isoparaffinic Hydrocarbons (Isopar M) (g) | Sorbitan Monooleate (g) | Initiator[1] (g) | Temp. (°C.) | Time Hours |
| 1 | 172.3 | 208.3 | — | .1 | 4.7 | — | 162 | 18.4 | .5 | 49–51 | 2 |
| 2 | 86.15 | 104 | — | .05 | 4.7 | .25 | 81 | 9.2 | .25 + .25 | 50–60 | 4 |
| 3 | 86.39 | 104 | — | .1 | 4.7 | .1 | 81 | 9.2 | .25 | 50–60 | 2 |
| 4 | 86.39 | 104 | — | .05 | 4.7 | .4 | 81 | 9.2 | .25 + .1 | 50–53 | 3 |
| 5 | 86.20 | 104.15 | — | .05 | 4.6 | .5 | 81 | 9.2 | .25 + .25 | 46–62 | 4 |

TABLE II-continued

| Polymer No. | Monomers (g) | H₂O (g) | NaCl (g) | Na₂ EDTA (g) | pH | NaHSO₃ (g) | Isoparaffinic Hydrocarbons (Isopar M) (g) | Sorbitan Monooleate (g) | Initiator[1] (g) | Temp. (°C.) | Time Hours |
|---|---|---|---|---|---|---|---|---|---|---|---|
| 6 | 86.20 | 104.15 | — | .05 | 7.8 | .25 | 81 | 9.2 | .25 | 45–51 | 3 |
| 7[2] | 81.14 | 99.1 | — | .05 | 10.1 | .5 | 81 | 9.2 | .25 | 45–90 | 4 |
| 8 | 85.95 | 103.9 | 0.2 | .05 | — | — | 81 | 9.2 | .25 | 45 ± .3 | 3 |
| 9 | 93.39 | 111.34 | 0.2 | .05 | 4.9 | — | 81 | 9.2 | .25 | 45 ± .3 | 3 |
| 10 | 92.37 | 110.32 | 0.2 | .05 | 4.9 | — | 81 | 9.2 | .20 | 45 ± .3 | 4 |
| 11 | 91.03 | 106.87 | 0.2 | .05 | 4.8 | — | 81 | 9.2 | .20 | 45 ± .4 | 3 |
| 12[3] | 91.0 | 113.74 | 0.2 | .05 | 4.9 | .4 | 81 | 9.2 | .20 | 45 ± .3 | 4 |
| 13 | 91.11 | 96.14 | 0.2 | .05 | 4.9 | — | 81 | 9.2 | .20 | 45 ± .2 | 3 |
| 14 | 93.39 | 111.34 | 20. | .05 | 7.8 | — | 81 | 9.2 | .1 + .1 | 40.6–43.7 | 5 |
| 15[3] | 115.53 | 169.31 | 10. | .05 | 8.9 | .35 | 81 | 9.2 | .1 + .1 | 45–50 | 6 |
| 16 | 115.53 | 156.82 | 10. | .05 | 7.7 | .3 | 81 | 9.2 | .1 + .1 | 40.7–42.7 | 8 |
| 17 | 93.39 | 124.47 | 6. | .05 | 7.5 | .2 | 81 | 6 | .1 + .1 | 42–45 | 7 |
| 18 | 98.88 | 137.06 | 6. | .05 | 7.9 | .2 | 81 | 6 | .2 + .2 | 41–49 | 6 |
| 19 | 86.20 | 107.65 | 6. | .05 | 8.3 | .2 | 81 | 6 | .1 + .1 | 40–45 | 4 |
| 20 | 93.39 | 124.46 | 6. | .05 | 7.4 | .2 | 81 | 6 | .1 + .1 | 37–41 | 6 |
| 21 | 108.28 | 159.26 | 6. | .05 | 7.6 | .2 | 81 | 6 | .1 + .1 | 39–43 | |

[1] 2,2' Azobis (2,4-dimethylvaleronitrile); +means 2 separate additions
[2] Reaction exotherm uncontrollable
[3] Reaction incomplete, little to no exotherm The polymers described above can be prepared using a solution technique instead of the water-in-oil emulsion technique. The solution technique involves reacting the monomers with initiators and buffer in an aqueous solution in the absence of oxygen. A reaction pH in the range of from about 6 to about 9 and a reaction temperature in the range of from about 32° F. to about 120° F. can be utilized to form the polymer solution.

EXAMPLE 5

The polymer emulsions formed as described in Example 4 are inverted in API brine, hydrated, crosslinked and evaluated for stability at 250° F.

EMULSION INVERSION AND POLYMER HYDRATION

A quantity of API brine is placed in a Waring blendor jar and mixed at low speed. An inverter such as a 50% by weight aqueous solution of dimethylbenzyltallow ammonium chloride is added in an amount of 10% by weight of emulsion to be inverted. The mixing rate is increased to about 1500 rpm and the amount of polymer emulsion used is added and mixed for one minute. The resulting viscosity is measured on a Model 35 FANN VG Meter with No. 1 spring and standard bob and sleeve to determine when complete hydration has occurred. For example, 300 ml of API brine are added to a one-liter Waring blendor jar and mixed at a low rate followed by adding one ml of the above-described inverter. Ten grams of polymer emulsion are added while mixing at 1500 rpm. Mixing is continued for one minute and viscosity is measured.

The results of these tests are shown in Table III.

TABLE III

Viscosity Properties of Inverted Polymers
Polymer Concentration: 1% by Weight of Fluid
Temperature: Ambient Conditions

| | Steady State FANN Dial Readings @ 100, 200 and 300 rpm | | | | | |
|---|---|---|---|---|---|---|
| Polymer No. | Deionized Water | | | API Brine | | |
| | 100 | 200 | 300 | 100 | 200 | 300 |
| 8 | 84 | 116 | 141 | 17 | 27 | 35 |
| 9 | 71 | 101 | 126 | 7 | 12 | 16 |
| 10 | 74 | 107 | 137 | 7 | 11 | 14 |
| 11 | 47 | 62 | 78 | 51 | 72 | 91 |
| 13 | 92 | 126 | 152 | 4 | 7 | 9 |
| 14 | 50 | 75 | 93 | 19 | 28 | 37 |
| 16 | 61 | 91 | 115 | 12 | 19 | 25 |
| 17 | 48 | 66 | 80 | 28 | 42 | 53 |
| 18 | 15 | 25 | 33 | 13 | 21 | 29 |
| 19 | 53 | 69 | 82 | 40 | 57 | 72 |
| 20 | 55 | 75 | 91 | 29 | 44 | 56 |
| 21 | 53 | 72 | 86 | 28 | 41 | 53 |

F. TEMPERATURE STABILITY 100 g of the hydrated polymer are placed in a glass pressure vessel. A desired amount of crosslinker such as 0.2% zirconium oxychloride is added to the vessel. The vessel is sealed and agitated to thoroughly mix the polymer and crosslinker. The vessel is then heated to the desired temperature by placing it in a heated oil bath. At desired intervals the sample is inspected and the stability of the crosslinked polymer visually noted.

The results of these tests are given in Table IV below.

TABLE IV

Crosslinked Polymer Stability at 250° F.
Polymer Concentration: 1% Base Fluid: API Brine

| Polymer No. | N₂[1] Purged | Crosslinker Name | %[2] | Stability hrs[3] | Final pH[4] | Observations |
|---|---|---|---|---|---|---|
| 21[5] | No | Potassium Pyroantimonate | 0.4 | <24 | 8.4 | homogeneous - no crosslinked gel |
| 21 | No | Formic Acid | 0.1 | | | homogeneous - no crosslinked gel |
| | | Potassium Pyroantimonate | 0.4 | <24 | 4.2 | |
| 21 | No | Potassium Pyroantimonate | 0.4 | | | homogeneous - crosslinked gel @ 48 hrs. |
| | | Zicronium Oxychloride | 0.1 | >48<96 | 8.1 | |

TABLE IV-continued

Crosslinked Polymer Stability at 250° F.
Polymer Concentration: 1% Base Fluid: API Brine

| Polymer No. | N$_2$[1] Purged | Crosslinker Name | %[2] | Stability hrs[3] | Final pH[4] | Observations |
|---|---|---|---|---|---|---|
| 20[6] | No | Potassium Pyroantimonate | 0.4 | <24 | 8.4 | homogeneous - no crosslinked gel |
| 20 | No | Formic Acid | 0.1 | | | homogeneous - no crosslinked gel |
| | | Potassium Pyroantimonate | 0.4 | <24 | 4.5 | |
| 20 | No | Potassium Pyroantimonate | 0.4 | | | homogeneous - crosslinked gel @ 48 hrs. |
| | | Zirconium Oxychloride | 0.1 | >48<96 | 7.8 | |
| 19[7] | No | Potassium Pyroantimonate | 0.4 | <24 | 8.3 | homogeneous - no crosslinked gel |
| 19 | No | Formic Acid | 0.1 | | | homogeneous - no crosslinked gel |
| | | Potassium Pyroantimonate | 0.4 | <24 | 4.4 | |
| 19 | No | Potassium Pyroantimonate | 0.4 | | | homogeneous - less viscosity than 21 or 20 |
| | | Zirconium Oxychloride | 0.1 | >48<96 | 7.4 | |
| 21 | No | Zirconium Oxychloride | 0.2 | >72 | 6.0 | crosslinked gel - some free H$_2$O |
| 21 | No | Zirconium Oxychloride | 0.2 | <16 | 8.5[8] | gel separated |
| 21 | No | Zirconium Lactate with Triethanolamine | 0.3 | >48<72 | 8.0 | crosslinked gel - ½ free H$_2$O |
| 21 | No | Zirconium Lactate with Triethanolamine | 0.3 | >24<48 | 8.7[8] | slight crosslink - free H$_2$O |
| 20 | No | Zirconium Oxychloride | 0.2 | >48<72 | 6.3 | rigid crosslinked gel ½ 48 hrs. |
| 20 | No | Zirconium Oxychloride | 0.2 | <16 | 8.4[8] | no crosslink - phase separation |
| 20 | No | Zirconium Lactate with Triethanolamine | 0.3 | >24<48 | 8.1 | slight crosslink - rehealed on cooling |
| 20 | No | Zirconium Lactate with Triethanolamine | 0.3 | >24<48 | 8.7[8] | slightly better than above gel |
| 19 | No | Zirconium Oxychloride | 0.2 | >24<48 | 5.3 | crosslinked gel - ½ free H$_2$O |
| 19 | No | Zirconium Oxychloride | 0.2 | <16 | 8.3[8] | homogeneous - no crosslinked gel |
| 19 | No | Zirconium Lactate with Triethanolamine | 0.3 | >16<24 | 8.0 | homogeneous - no crosslinked gel |
| 19 | No | Zirconium Lactate with Triethanolamine | 0.3 | <16 | 8.7[8] | homogeneous - no crosslinked gel |
| 18 | Yes | Zirconium Oxychloride | 0.1 | <19 | — | polymer flocculated |
| 18 | Yes | Zirconium Oxychloride | 0.2 | <19 | — | polymer flocculated |
| 18 | Yes | Zirconium Lactate | 0.1 | >48<72 | — | polymer separated - best @ 72 hrs. |
| 18 | Yes | Zirconium Lactate | 0.2 | >48<72 | — | polymer separated |
| 18 | Yes | Zirconium Lactate | 0.3 | >48<72 | — | polymer separated - best at 48 hrs. |
| 18 | Yes | Zirconium Acetate | 0.2 | <19 | | polymer flocculated |
| 17 | Yes | Zirconium Oxychloride | 0.1 | >72<144 | | rigid crosslinked gel @ 72 hrs. |
| 17 | Yes | Zirconium Oxychloride | 0.2 | >72<144 | | same as above - trace free H$_2$O |
| 17 | Yes | Zirconium Lactate | 0.1 | >72<144 | | slight crosslinked gel - trace free H$_2$O |
| 17 | Yes | Zirconium Lactate | 0.2 | >72<144 | | moderate crosslinked gel - trace free H$_2$O |
| 17 | Yes | Zirconium Lactate | 0.3 | >72<144 | | rigid crosslinked gel - trace free H$_2$O |
| 17 | Yes | Zirconium Acetate | 0.2 | >72<144 | | less rigid than above test polymer flocculated - free H$_2$O |
| 18 | Yes | Zirconium Lactate with Triethanolamine | 0.1 | >6<24 | | |
| 18 | Yes | Zirconium Lactate with | 0.2 | >6 | | sample lost, broke sample jar |

TABLE IV-continued

Crosslinked Polymer Stability at 250° F.
Polymer Concentration: 1% Base Fluid: API Brine

| Polymer No. | $N_2$[1] Purged | Crosslinker Name | %[2] | Stability hrs[3] | Final pH[4] | Observations |
|---|---|---|---|---|---|---|
| 18 | Yes | Zirconium Lactate with Triethanolamine | 0.3 | >24<48 | | more flocculated polymer than above |
| 17 | Yes | Zirconium Lactate with Triethanolamine | 0.2 | >72 | | crosslinked gel - free $H_2O$ |
| 17 | Yes | Zirconium Lactate with Triethanolamine | 0.3 | >72 | | weak crosslinked gel - free $H_2O$ |
| 17 | Yes | Zirconium Lactate with Triethanolamine | 0.4 | >72 | | same as above with less free $H_2O$ |
| 13 | Yes | Zirconium Lactate with viscosity 7 cps Triethanolamine | 0.3 | — | | no indication of crosslink - base gel |
| 13 | Yes | Zirconium Lactate with viscosity 7 cps Triethanolamine | 0.6 | — | | no indication of crosslink - base gel |
| 16 | Yes | Zirconium Lactate with Triethanolamine | 0.3 | >1<66 | | poor crosslink - base gel viscosity 12 cps |
| 16 | Yes | Zirconium Lactate with Triethanolamine | 0.6 | >1<66 | | poor crosslink - base gel viscosity 12 cps |
| 17 | Yes | Zirconium Lactate with Triethanolamine | 0.3 | >96<240 | | crosslinked gel with free $H_2O$ @ 96 hrs. |
| 17 | Yes | Zirconium Oxychloride | 0.3 | >1<66 | | overcrosslinked - majority free $H_2O$ |
| 17 | Yes | Zirconium Oxychloride | 0.6 | >1<66 | | same as above test |
| 18 | Yes | Zirconium Lactate with Triethanolamine | 0.3 | >1<66 | | crosslinked gel with free $H_2O$ @ 66 hrs. |
| 18 | Yes | Zirconium Lactate with Triethanolamine | 0.6 | >1<66 | | same as above test |
| 18 | Yes | Zirconium Oxychloride | 0.3 | >1<66 | | majority free $H_2O$ with crosslinked gel |

[1] to reduce oxygen level $N_2$ was bubbled through gels and pressure vessels were purged
[2] % = volume % based on total weight of gel
[3] stability hrs. - the majority of the gel had some crosslinked character. Some free $H_2O$ may be present. No precipitate noted.
[4] final pH - pH was obtained after test was completed and sample cooled to ambient condition
[5] initial pH of base gel 6.73
[6] initial pH of base gel 7.0
[7] initial pH of base gel 6.9
[8] pH adjusted to this value with NaOH Steady state viscosity properties of polymers 8 through 21 in deionized water and API brine are shown in Table III. The relative molecular weights and degrees of ionic character of the prepared copolymers are utilized to evaluate the synthesis conditions. Viscosity properties in deionized water are a function of molecular weight and degree of ionic character while the viscosity difference in these two base fluids is predominantly a function of the degree of ionic character.

Preliminary stability data at 250° F. for several polymers crosslinked with various metal crosslinkers are presented in Table IV. Gel stability is dependent upon the polymer, crosslinker, crosslinker concentration, pH and oxygen content. In general, the most stable gels are formed with polymers 17, 20 and 21 when crosslinked with 0.1 or 0.2% of zirconium oxychloride or 0.3% of zirconium lactate with triethanolamine.

EXAMPLE 6

Vinyl monomers containing vicinal diol groups are prepared as follows.

A.
Methacrylamidopropyldimethyl-2,3-dihydroxypropylammonium sulfate (MAPDMDAPAS)

To a 1-liter glass beaker containing a magnetic stirrer is added 170.26 g (1 mole) of DMAPMA and 170.26 g of deionized water while stirring. Initial pH and temperature are 11.2° and 23.1° C., respectively. Two addition funnels are suspended above the beaker; one contains 75.6 g (1 mole) of glycidol and the other contains 98.2 g of 50% $H_2SO_4$. The pH and temperature are monitored continuously during the drop-wise addition of glycidol. Temperature is maintained between 19.5° and 27.5° C. by placing the beaker in an ice bath. The pH is maintained between 10.6 and 11.2 by adding 50% $H_2SO_4$ as needed. All of the glycidol is added within 1 hour and 4 minutes. An additional 75.6 g of water is added to the reaction mixture; a portion is flowed through the addition funnel which contained the glycidol and the remainder is added to the addition funnel containing the remaining $H_2SO_4$. The ice bath surrounding the reaction vessel is removed and replaced with a warm water bath in order to raise the reaction temperature to 40° C. The remaining acid and water mixture is added to the reaction vessel over a period of 2 hours and 41 minutes. During this stepwise addition the temperature is held at about 40° C. and the pH is maintained between 11.3 and 10.1 until the last portion of acid is added. The final pH is 4.55. The reaction mixture is then placed in a sealed brown bottle and submerged in a 42° C. bath. The reaction mixture is removed at 16 hours. The final pH of the product is 5.2 at room temperature.

B. Methacrylamidopropyldimethyl-2,3-dihydroxypropylammonium chloride (MAPDMDHPAC)

To a 1-quart brown bottle is added 170.3 g (1 mole) DMAPMA and 280.8 g of deionized water. Mixing is accomplished by swirling the bottle. To this mixture is added 110.5 g (1 mole) of 3-chloro-1,2-propanediol. A small exotherm is observed. The sealed bottle containing the reaction mixture is submerged in a water bath controlled to about 40° C. After reacting at this temperature for 20 hours the reaction mixture is removed.

The quaternary ammonium chloride monomer (prepared according to Procedure B) is formed by substitution of the chloride of α-chlorohydrin with the nitrogen of the tertiary amine. The quantity of chloride ion produced during the reaction is determined by titration with silver nitrate. Based on this analysis, it is calculated that 99.6% of the α-chlorohydrin is reacted and therefore, the percent of conversion is 99.6%.

The vicinal diol content of MAPDMDHPAS and MAPDMDHPAC are determined to be 53.0% and 50.6%, respectively. The theoretical diol content of each monomer is 50.0%, since each is prepared as a 50% aqueous solution.

EXAMPLE 7

A variety of polymers containing vicinal diol groups are prepared. The polymers are hydrated and the resulting gels are evaluated for stability at high temperature. The hydrated polymers are then crosslinked and evaluated for stability at high temperatures.

Thermal stability tests of hydrated emulsion polymers at 250° F. in API brine are summarized in Tables V and VI. Thermal stability tests of hydrated solution polymers at 280° F. in API brine are summarized in Tables V and VI. Thermal stability tests of hydrated solution polymers at 280° F. in API brine are summarized in Table VII. The solution polymers are prepared by reacting the starting materials and initiators in a 2% potassium chloride solution.

PROCEDURE

To obtain a 100 g sample of hydrated polymer gel, 97.7 g of deionized water is added to a 500 ml Waring blendor. An inverter such as a 50% by weight aqueous solution of dimethylbenzyltallowammonium chloride is added in an amount of 0.33 ml to the water with gentle mixing. The emulsion polymer (3.33 g) is quickly added with a syringe while mixing at about 1500 rpm. Mixing is continued for 2 minutes. The sample is left static at least one hour at ambient temperature to fully hydrate before use or evaluation.

A 100 g sample of hydrated base gel is placed in an 8 oz. glass jar. The sample is purged 30 minutes by bubbling $N_2$ through the sample. The jar is sealed and then placed inside a purged pressure vessel. The vessel is placed into an oil bath at the desired temperature for the required time period. The vessel is then removed and cooled to ambient temperature. The sample is removed and evaluated. Data such as pH, viscosity and gel condition are recorded.

TABLE V

Thermal Stability of 1% Emulsion Polymers at 250° F. in API Brine

| Polymer | Initial* Viscosity (cp) | Final* Viscosity (cp) | Time at 250° F. (days) | Viscosity Retained (%) |
|---|---|---|---|---|
| 80.10Q.10DS.P21 | 200 | 12.0 | 2.25 | 6 |
| 50.40.10DS.P24 | 85 | 19.0 | 5.0 | 22 |
| 50.40.10DS.P24 | 85 | 7.5 | 12.0 | 9 |
| 50.40Q.10DS.P23 | 75 | 6.5 | 5.0 | 9 |
| 50.40Q.10DS.P25 | 85 | 10.0 | 5.0 | 12 |
| 90.0.10DS.P20 |  | 19.0 | 2.25 |  |
| 90.0.10Q.P19 |  | 6.0 | 2.25 |  |

*Viscosity measured on a Brookfield LVT using a number 1 spindle at 6 rpm.

TABLE VI

Thermal Stability of 1% Emulsion Polymers in API Brine

| Polymer | Initial* Viscosity (cp) | Final* Viscosity (cp) | Retained Viscosity (%) | Temperature (°F.) | Time at Temperature (days) |
|---|---|---|---|---|---|
| 70.20.10DS.P43 | 130 | 20 | 14 | 250 | 5.0 |
| 70.20.10DS.P43 | 130 | 55 | 42 | 250 | 7.0 |
| 70.20.10DS.P43 | 130 | 150 | 115 | 250 | 10.0 |
| 50.40.10DS.P41 | 272 | 826 | 304** | 280 | 0.9 |
| 50.40.10DS.P41 | 345 | 30 | 8 | 280 | 0.9 |
| 50.40.10DS.P40 | 180 | 130 | 72 | 250 | 3 |
| 50.40.10DS.P40 | 180 | 100 | 56 | 250 | 5 |
| 50.40.10DS.P40 | 180 | 35 | 20 | 250 | 7 |
| 50.40.10DS.P40 | 180 | 10 | 6 | 250 | 10 |
| 50.40.10DS.P41 | 190 | 230 | 120 | 250 | 3 |
| 50.40.10DS.P41 | 190 | 65 | 34 | 250 | 5 |
| 50.40.10DS.P41 | 190 | 21 | 11 | 250 | 7 |
| 50.40.10DS.P41 | 190 | 25 | 13 | 250 | 10 |
| 60.30.10DS.P42 | 150 | 100 | 67 | 250 | 3 |
| 60.30.10DS.P42 | 150 | 25 | 17 | 250 | 5 |
| 60.30.10DS.P42 | 150 | 30 | 20 | 250 | 7 |

*Viscosity measured on a Brookfield LVT using a number 1 spindle at 6 rpm.
**Sample believed to be contaminated with metal ions during test.

TABLE VII

Thermal Stability of 1% Solution Polymers at 280° F. in API Brine for 22 Hours

| Polymer | Initial* Viscosity (cp) | Final* Viscosity (cp) | Viscosity Retained (%) |
|---|---|---|---|
| 75.20.5DS.9K | 617 | 320 | 52 |
| 70.20.10DS.7K | 87 | 49 | 56 |
| 70.20.10DS.76 | 58 | 54 | 93 |
| 70.20.10DS.7K | 101 | 42 | 42 |
| 70.20.10Q.80 | 121 | 79 | 65 |
| 70.20.10Q.80 | 119 | 26 | 22 |
| 70.20.10Q.78 | 94 | 43 | 46 |
| 70.20.10A.106 | 67 | 28 | 42 |
| 50.40.10DS.8K | 74 | 49 | 66 |
| 50.40.10DS.8K | 78 | 47 | 60 |
| 50.40.10DS.8K | 82 | 44 | 54 |
| 0.90.10DS.87 | 36 | 55 | 152 |
| 0.90.10DS.12K | 25 | 24 | 96 |
| 0.90.10DS.12K | 24 | 23 | 96 |
| 0.90.10DS.12K | 21 | 16 | 76 |

*Viscosity measured on a Brookfield LVT using a number 1 spindle at 6 rpm.

Tables V, VI and VII show the superiority of the 0.90.10DS polymer formulation over other polymer formulations. The stability testing of inverse emulsion polymers at 250° and 280° F. shows a loss of viscosity with time except in the case of 70.20.10DS.P43 (see Table IV). This polymer at 1% concentration at 250° F.

in API brine gives a decrease in viscosity with time until 10 days when a viscosity increase is observed. This viscosity increase is supported by the 280° F. studies. The 70.20.10DS.P43 solutions appear to crosslink or get thicker after 22 hours. This phenomena is not observed using the equivalent solution polymer, 70.20.10DS.7K. This indicates that there may be some differences in the emulsion and solution polymers.

The visual evaluation of crosslinked polymers for thermal stability is more difficult than the evaluation of the base hydrated polymers. The stability of the crosslinked gel is sensitive to the crosslinker, crosslinker concentration and polymer concentration in addition to the temperature. The crosslinked gels are evaluated on a scale as follows:
1. failure—no viscosity or precipitate forms;
2. 2 phase—separation of polymer and free fluid;
3. homogeneous—viscosity present but not a lipping gel;
4. lipping—crosslinked fluid which forms a tongue upon transfer;
5. rigid—crosslinked fluid which tries to retain its shape.

The initial testing of the thermal stability of the crosslinked gels is performed at 180° F. and is summarized in Table VIII. The polymers react with a variety of crosslinkers and are stable for extended periods of time at 180° F.

The crosslinked polymers are evaluated at 280° F. and 300° F. in API brine at 1 and 0.5% polymer concentrations. A concentration range of zirconium lactate crosslinker of 0.075 to 0.6 volume/volume % is used to evaluate these polymers. The results of these tests are given in Tables IX and X.

PROCEDURE

Stability tests on crosslinked polymers are performed by placing 100 g samples of hydrated base gels in 8 oz glass jars. The designated amount and type of crosslinker is added with a micropipette syringe. The jars are each sealed and then placed inside a purged pressure vessel with enough water placed inside the vessel to cover the sample level in the jar. The vessel is placed in an oil bath of the desired temperature for the required time period. The vessel is then removed and cooled to ambient temperature. The samples are removed and visually evaluated.

TABLE VIII

Thermal Stability of Crosslinked Gels at 180° F. in API Brine

| Polymer | Polymer Concentration (%) | Crosslinker | Crosslinker Concentration (%) | Time at Temperature (days) | Gel Evaluation |
|---|---|---|---|---|---|
| 50.40.10DS.6K | 1.0 | Potassium Pyroantimonate | .4 | 8 | homogeneous |
| 50.40.10DS.6K | 1.0 | Zirconium Acetate | .2 | 8 | rigid |
| 50.40.10DS.6K | 1.0 | Zirconium Lactate with Amine | .4 | 8 | homogeneous |
| 50.40.10DS.P24 | 1.0 | Potassium Pyroantimonate | .4 | .75 | 2 phase |
| 50.40.10DS.P24 | 1.0 | Zirconium Acetate | .2 | .75 | rigid |
| 50.40.10DS.P24 | 1.0 | Zirconium Lactate | .4 | .75 | rigid |
| 50.40.10DS.P24 | 1.0 | Basic Aluminum Acetate | .4 | .75 | 2 phase |
| 50.40.10DS.P24 | 1.0 | Zirconium Oxychloride | .2 | .75 | rigid |
| 50.40.10DS.P24 | 1.0 | Zirconium Lactate | .4 | 3 | rigid |
| 50.40.10DS.P24 | 1.0 | Zirconium Lactate | .4 | 5 | rigid |
| 50.40.10DS.P24 | 1.0 | Zirconium Lactate | .4 | 10 | rigid |
| 50.40.10DS.P26 | 1.0 | Zirconium Lactate | .4 | 3 | rigid |
| 50.40.10DS.26 | 1.0 | Zirconium Lactate | .4 | 5 | rigid |
| 50.40.10DS.26 | 1.0 | Zirconium Lactate | .4 | 10 | rigid |
| 55.40.5DS.5K | 1.0 | Potassium Pyroantimonate | .4 | 8 | homogeneous |
| 55.40.5DS.5K | 1.0 | Zirconium Acetate | .2 | 8 | rigid |
| 55.40.5DS.5K | 1.0 | Zirconium Lactate with Amine | .4 | 8 | homogeneous |
| 55.40.5DS.P27 | 1.0 | Zirconium Lactate | .4 | 3 | rigid |
| 55.40.5DS.P27 | 1.0 | Zirconium Lactate | .4 | 5 | rigid |
| 55.40.5DS.P27 | 1.0 | Zirconium Lactate | .4 | 10 | rigid |
| 0.90.10DC.124 | 0.5 | Zirconium Lactate | .2 | 2.8 | homogeneous |
| 0.90.10DC.124 | 0.5 | Zirconium Lactate | .6 | 2.8 | rigid |
| 0.90.10DC.129 | 0.5 | Zirconium | .2 | 2.8 | lipping |

TABLE VIII-continued

Thermal Stability of Crosslinked Gels at 180° F. in API Brine

| Polymer | Polymer Concentration (%) | Crosslinker | Crosslinker Concentration (%) | Time at Temperature (days) | Gel Evaluation |
|---|---|---|---|---|---|
| 0.90.10DS.123 | 0.5 | Lactate Zirconium Lactate | .2 | 2.8 | lipping |

TABLE IX

Thermal Stability of Crosslinked Gels at 280° F. in API Brine

| Polymer | Polymer Concentration (%) | Zirconium Lactate Concentration (%) | Time at Temperature (days) | Gel Evaluation |
|---|---|---|---|---|
| 50.40.10DS.8K | .5 | .15 | 2.8 | 2 phase |
| 0.90.10DS.118 | .5 | .6 | 2 | 2 phase |
| 0.90.10DS.118 | .5 | .6 | 1 | 2 phase |
| 0.90.10DS.118 | .5 | .4 | 2 | 2 phase |
| 0.90.10DS.118 | .5 | .4 | 1 | 2 phase |
| 0.90.10DS.118 | .5 | .2 | 1 | lipping |
| 0.90.10DS.118 | .5 | .3 | .9 | 2 phase |
| 0.90.10DS.118 | .5 | .15 | .9 | homogeneous |
| 0.90.10DS.118 | .5 | .075 | .9 | homogeneous |
| 0.90.10DS.118 | .5 | .2 | 7 | homogeneous |
| 0.90.10DS.118 | .5 | .2 | 14 | homogeneous |
| 0.90.10DS.118 | .5 | .2 | 21 | 2 phase |
| 0.90.10DS.118 | .5 | .15 | 7 | homogeneous |
| 0.90.10DS.118 | .5 | .15 | 10 | lipping |
| 0.90.10DS.118 | .5 | .15 | 14 | 2 phase |
| 0.90.10DS.118 | .5 | .1 | 7 | homogeneous |
| 0.90.10DS.118 | 1.0 | .6 | .9 | lipping |
| 0.90.10DS.118 | 1.0 | .4 | .9 | lipping |
| 0.90.10DS.118 | 1.0 | .3 | .9 | lipping |
| 0.90.10DS.118 | 1.0 | .15 | .9 | lipping |

TABLE X

Thermal Stability of Crosslinked Gels at 300° F. in API Brine

| Polymer | Polymer Concentration (%) | Zirconium Lactate Concentration (%) | Time at Temperature (days) | Gel Evaluation |
|---|---|---|---|---|
| 0.90.10DS.118 | .5 | .3 | 0.9 | lipping |
| 0.90.10DS.118 | .5 | .3 | 1.8 | 2 phase |
| 0.90.10DS.118 | .5 | .25 | 0.9 | lipping |
| 0.90.10DS.118 | .5 | .25 | 1.8 | 2 phase |
| 0.90.10DS.118 | .5 | .2 | 0.9 | lipping |
| 0.90.10DS.118 | .5 | .2 | 1.8 | lipping |
| 0.90.10DS.118 | .5 | .2 | 4.0 | lipping |
| 0.90.10DS.118 | .5 | .15 | 0.9 | lipping |
| 0.90.10DS.118 | .5 | .15 | 1.8 | lipping |
| 0.90.10DS.118 | .5 | .15 | 4.0 | lipping |
| 0.90.10DS.118 | .5 | .1 | 0.9 | homogeneous |
| 0.90.10DS.118 | .5 | .1 | 1.8 | lipping |
| 0.90.10DS.118 | .5 | .1 | 4.0 | homogenous |
| 0.90.10DS.118 | .5 | .05 | 0.9 | homogeneous |
| 0.90.10DS.118 | .5 | .05 | 1.8 | homogenous |
| 0.90.10DS.123 | .5 | .2 | 0.9 | lipping |
| 0.90.10DS.123 | .5 | .2 | 1.8 | lipping |
| 0.90.10DS.123 | .5 | .2 | 3.7 | lipping |
| 0.90.10DS.131 | .5 | .2 | 6.0 | lipping |
| 0.90.10DS.131 | .5 | .2 | 10.0 | lipping |
| 0.90.10DS.131 | .5 | .2 | 14.0 | lipping |
| 0.90.10DS.131 | .5 | .6 | 4.0 | 2 phase |
| 0.85.15DS.132 | .5 | .2 | 4.0 | lipping |
| 0.95.5DS.130 | .5 | .2 | 4.0 | homogeneous* |
| 0.95.5DS.130 | .5 | .2 | 4.0 | 2 phase |

*The sample contained 10% by weight 12-200 mesh dolomite.

EXAMPLE 8

A vicinal diol containing polymer is prepared as follows. 100 g of a 1% active solution of a copolymer of DMAEMA and acrylamide in equal mole percentages are adjusted to a pH of 10 with sodium hydroxide. This solution is reacted for one hour at ambient temperature with 0.15 g of glycidol. The resulting reaction mixture (gel) is cross-linkable with zirconium lactate and shows better thermal stability than the starting DMAEMA-acrylamide copolymer when crosslinked with zirconium lactate.

What is claimed is:

1. A method of treating a high temperature subterranean formation comprising contacting said formation with a highly viscous gel formed of an aqueous fluid, a water soluble polymer containing crosslinkable vicinal diol groups and a crosslinking agent selected from the group consisting of water soluble salts and complexes of multivalent cations, said water soluble polymer comprising a copolymer containing a monomer having the structural formula:

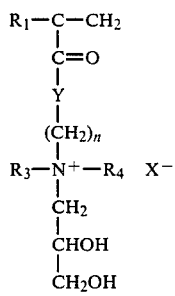

wherein
$R_1$ is hydrogen or methyl;
Y is oxygen of NH;
$R_3$ and $R_4$ are independently methyl or ethyl;
n is 2 or 3; and $X^-$ is a halogen, sulfate, $CH_3SO_4$ or $CH_3COO^-$.

2. The method of claim 1 wherein said one or more other polymers are selected from the group consisting of N,N-dimethylacrylamide, acrylamide, methacrylamide, 2-acrylamido-2-methylpropanesulfonic acid, sodium styrene sulfonate, N-vinyl-2-pyrrolidone and acrylic acid.

3. The method of claim 1 wherein said water soluble polymer containing crosslinkable vicinal diol groups is a copolymer of MAPDMDHPAS and NNDMA.

4. The method of claim 1 wherein said water soluble polymer containing crosslinkable vicinal diol groups is a copolymer of MAPDMDHPAC and NNDMA.

5. The method of claim 1 wherein Y is NH, n is 3, $R_1$ is methyl, $R_3$ and $R_4$ are each methyl and $X^-$ is sulfate.

6. The method of claim 1 wherein Y is NH, n is 3, $R_1$ is methyl, $R_3$ and $R_4$ are each methyl and $X^-$ is $Cl^-$.

* * * * *